United States Patent
Burcham et al.

(10) Patent No.: US 10,009,741 B1
(45) Date of Patent: Jun. 26, 2018

(54) CONTENT DISTRIBUTION CHANNEL SELECTION, TRANSCODING, AND TRACKING GATEWAY

(71) Applicant: Sprint Communications Company L.P., Overland Park, KS (US)

(72) Inventors: Robert H. Burcham, Overland Park, KS (US); Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days. days.

(21) Appl. No.: 15/638,064

(22) Filed: Jun. 29, 2017

Related U.S. Application Data

(63) Continuation of application No. 15/152,813, filed on May 12, 2016, now Pat. No. 9,743,262.

(51) Int. Cl.
| | |
|---|---|
| *H04M 3/42* | (2006.01) |
| *H04W 4/18* | (2009.01) |
| *G06Q 30/02* | (2012.01) |
| *H04L 29/08* | (2006.01) |
| *H04W 88/16* | (2009.01) |

(52) U.S. Cl.
CPC .......... *H04W 4/18* (2013.01); *G06Q 30/0248* (2013.01); *G06Q 30/0267* (2013.01); *H04L 67/327* (2013.01); *H04W 88/16* (2013.01)

(58) Field of Classification Search
CPC ..... H04L 65/4084; G06Q 30/00; G06Q 30/02
USPC ........................ 725/61; 705/26.2, 26.8, 14.51
See application file for complete search history.

(56) References Cited

U.S. PATENT DOCUMENTS

| | | | |
|---|---|---|---|
| 8,990,104 B1* | 3/2015 | Zhu | G06Q 30/0275 |
| | | | 705/14.4 |
| 9,743,262 B1 | 8/2017 | Burcham et al. | |
| 2007/0043616 A1 | 2/2007 | Kutaragi et al. | |
| 2013/0152139 A1 | 6/2013 | Davis et al. | |
| 2014/0108178 A1* | 4/2014 | Cao | G06Q 30/0641 |
| | | | 705/26.2 |

OTHER PUBLICATIONS

Notice of Allowance dated Apr. 13, 2017, U.S. Appl. No. 15/152,813, filed May 12, 2016.

* cited by examiner

*Primary Examiner* — Kiet Doan

(57) ABSTRACT

An auxiliary content delivery gateway. The gateway comprises a processor, a non-transitory memory, and an application stored in the non-transitory memory. When executed by the processor the application creates auxiliary content request messages comprising a collaborator mediation indication based on requests for auxiliary content received from a plurality of mobile communication devices and transmits the auxiliary content request messages to a plurality of auxiliary content sourcing channels, whereby the auxiliary content sourcing channels discern that the auxiliary content request messages do not constitute click-fraud based on the collaborator mediation indication in the auxiliary content request messages. The application further receives auxiliary content response messages from the plurality of auxiliary content sourcing channels and transmits selected auxiliary content to the mobile communication devices based on the auxiliary content response messages.

16 Claims, 5 Drawing Sheets

CONTENT DISTRIBUTION CHANNEL SELECTION, TRANSCODING, AND TRACKING GATEWAY

CROSS-REFERENCE TO RELATED APPLICATIONS

This application claims priority as a continuation application to U.S. patent application Ser. No. 15/152,813 filed on May 12, 2016, entitled "Content Distribution Channel Selection, Transcoding, and Tracking Gateway" by Robert H. Burcham, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are very commonly used and have become an electronic platform for delivering a wide variety of information content including reportage, entertainment content, and advertisement content. In some cases, content web sites offer free content to electronic communication devices at no cost and recover their operating costs and a profit by stitching advertising content in with content delivered responsive to user requests. Advertisement suppliers may bid to have their advertisement presented on an electronic device along with specifically requested content, for example in a head-of-page location, in a side-margin location, or in a bottom-of-page location relative to the specifically requested content.

SUMMARY

In an embodiment, a method of delivering auxiliary content to a mobile communication device is disclosed. The method comprises receiving a first request for auxiliary content by a gateway network node from an application on a first mobile communication device, where the request is formatted in accordance with a gateway application programming interface (API) and the gateway network node is provided by a computer system, selecting a first channel of a plurality of auxiliary content sourcing channels by the gateway based on a content sourcing priority, and retrieving a first auxiliary content by the gateway from the first channel. The method further comprises transmitting the first auxiliary content by the gateway to the first mobile communication device, receiving an update to the content sourcing priority by the gateway, and receiving a second request for auxiliary content by the gateway from an application on a second mobile communication device. The method further comprises selecting a second channel of the auxiliary content sourcing channels by the gateway based on the updated content sourcing priority, retrieving a second auxiliary content by the gateway from the second channel, and transmitting the second auxiliary content by the gateway to the second mobile communication device.

In another embodiment, a method of delivering auxiliary content to a mobile communication device is disclosed. The method comprises receiving a request for auxiliary content by a gateway network node from an application on a mobile communication device, where the request is formatted in accordance with a gateway application programming interface (API) and the gateway network node is provided by a computer system and selecting a first channel of a plurality of auxiliary content sourcing channels by the gateway based on a content sourcing priority, wherein the first channel comprises a plurality of independent content sources, wherein at least some of the independent content sources are configured to receive content requests formatted in accordance with APIs different from each other and different from the gateway API. The method further comprises transcoding the request for auxiliary content by the gateway network node to a plurality of different formats according to different APIs of the auxiliary content sourcing channels, sending transcoded requests for auxiliary content to the auxiliary content sourcing channels, and receiving responses to the transcoded requests for auxiliary content from the auxiliary content sourcing channels. The method further comprises selecting one of the responses from the auxiliary content sourcing channels, transcoding the response and an associated auxiliary content from a format in accordance with an API of an auxiliary sourcing channel to the format in accordance with the gateway API, and sending the transcoded response and associated auxiliary content to the application on the mobile communication device.

In yet another embodiment, an auxiliary content delivery gateway is disclosed. The gateway comprises a processor, a non-transitory memory, and an application stored in the non-transitory memory. When executed by the processor the application creates auxiliary content request messages comprising a collaborator mediation indication based on requests for auxiliary content received from a plurality of mobile communication devices and transmits the auxiliary content request messages to a plurality of auxiliary content sourcing channels, whereby the auxiliary content sourcing channels discern that the auxiliary content request messages do not constitute click-fraud based on the collaborator mediation indication in the auxiliary content request messages. The application further receives auxiliary content response messages from the plurality of auxiliary content sourcing channels and transmits selected auxiliary content to the mobile communication devices based on the auxiliary content response messages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
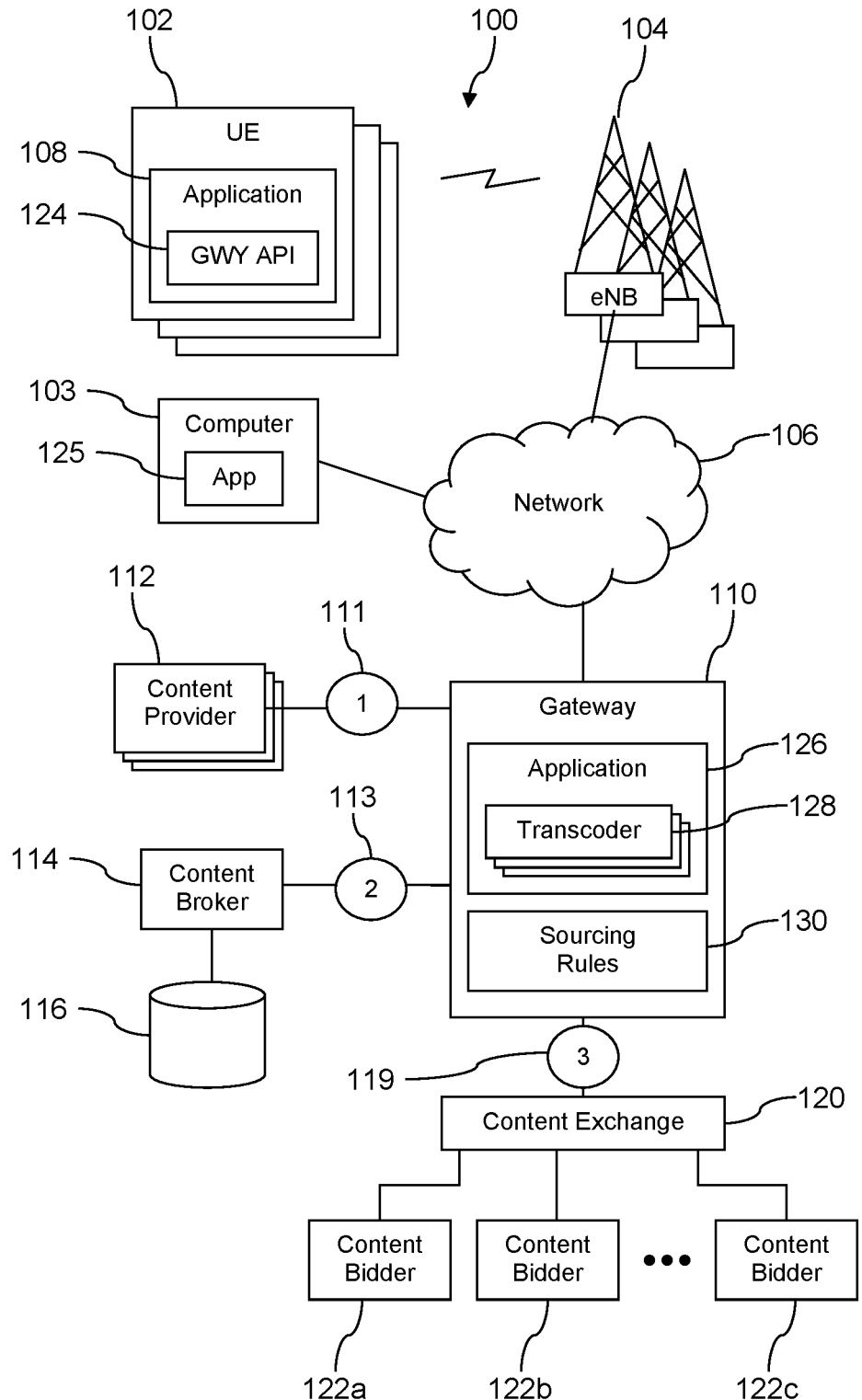
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An auxiliary content delivery gateway is taught that promotes convenient and timely adaptation of content channel sourcing. Applications executing on user equipments (UEs) may request auxiliary content from the gateway for display presentation on the UE proximate to presentation of application specific information and/or media. For example, a game application may request ad content from the gateway for display above the frame in which the game content is presented. The gateway may dynamically select from among a plurality of separate auxiliary content sourcing channels to satisfy the auxiliary content request. For example, the gateway may select to send the request for auxiliary content to one or more auxiliary content providers or demand side partners (DSPs), based on a current content sourcing rule or content sourcing policy. Over time and in response to changed operating conditions, the content sourcing rule may be revised and then the gateway may instead request auxiliary content from different auxiliary content sourcing channels, for example from an auxiliary content broker managed by a wireless communication service provider that operates the gateway. In an embodiment, the gateway receives auxiliary content requests from many UEs and may inter-mix auxiliary content sourcing channel selection among each of the plurality of auxiliary content sourcing channels, modulating a relative balance among the different content sourcing channels based on the content sourcing rules. Formerly changes in content sourcing rules or priorities would have been transmitted to each of the UEs—for example a significant portion of tens of millions of UEs—which entailed both time delays in propagating the changed priorities as well as burdening the network with the sourcing rule messages themselves.

The UEs may be configured to send auxiliary content requests to the gateway using an application programming interface (API) that is supported by the gateway, which may be referred to as the gateway API. By contrast, the auxiliary content providers may expect to receive auxiliary content requests formatted according to different APIs supported by them. The gateway provides transcoding and/or reformatting of auxiliary content requests from the request format received from the UEs to one or more auxiliary content request formats supported by the auxiliary content providers. For example, the gateway may receive an auxiliary content request in a its own format and reformat or transcode the request to a first auxiliary content request in a first request format, a second auxiliary content request in a second request format, and a third auxiliary content request in a third request format and then send the first, second, and third auxiliary content requests out to corresponding first auxiliary content provider, second auxiliary content provider, and third auxiliary content provider. The gateway may receive responses from the auxiliary content providers formatted in different formats, select one of the auxiliary content responses, reformat the respond to a format supported by the gateway (i.e., transcode the auxiliary content response), and return the auxiliary content to the requesting UE in the format supported by the gateway.

Formerly, the applications executing on the UEs would have implemented the formats for a plurality of the auxiliary content providers. This could be a burden on application developers or might result in an undesirable barrier to entry for new auxiliary content providers. Additionally, in the event of auxiliary content provider changing its API extended to UEs and/or applications executing on the UEs, each UE and/or each of possibly many applications on each UE would need to be revised and revisions pushed to the UEs to adapt to the changed auxiliary content provider API. By contrast, using the auxiliary content delivery gateway taught herein, such changes can be restricted to limited changes on the auxiliary content delivery gateway. This can reduce the effort and the cycle time of auxiliary content providers of deploying new APIs, which may be improved APIs that offer enhanced features and/or functionality that would be beneficial to provide to users of UEs. This would also likely promote auxiliary content providers choosing to undertake and deploy such developments whereas formerly they might not have due to the trouble and time entailed in such an effort under previously known systems.

In an embodiment, the auxiliary content providers may expect the content requests to reach them from a large number of different UEs and may be confused or misled by the content requests instead reaching them from a single device—the gateway. In some circumstances this may be confuted with "click-fraud" by the auxiliary content providers, for example when the auxiliary content providers provide mobile advertisements to UEs. The present disclosure contemplates a number of solutions to avoid this confusion. In an embodiment, the gateway may provide a special indication in a header of the auxiliary content request message, for example a collaborator mediation indication. This may simply be a flag or a parameter set in the header of the request message. Alternatively, the indicator may be an encrypted message that is not easily spoofed by others. In an embodiment, a third party attribution service may audit the auxiliary content request messages of the gateway and log the traffic for later challenging and/or substantiation by the auxiliary content providers. In support of this solution, the gateway may keep logs of its auxiliary content request messages and provide those to the different auxiliary content providers. In this way, the auxiliary content providers may assure themselves against the possibility of click fraud.

In some cases the gateway may process tens of thousands or hundreds of thousands of auxiliary content requests per second. As such, the gateway is necessarily a computer system and the processes described herein are computer implemented processes. The gateway taught herein provides an improved computer system in a variety of different senses.

Turning now to FIG. 1, a system 100 is described. In an embodiment, the system 100 comprises a plurality of user equipments (UEs) 102, a plurality of enhanced node Bs (eNBs) 104, and a network 106. The eNBs 104 provide wireless communication links to the UEs 102 to link them to the network 106 and provide both voice communication and data communication services. Some of the UEs 102 have one or more applications 108 that may execute on the UE, for example a gaming application, a browser application, a navigation application, or other applications. The application 108 may request auxiliary content from a gateway 110. The gateway 110 may obtain auxiliary content to supply the demand of applications 108 on UEs 102 from a plurality of auxiliary content sourcing channels—a first auxiliary content sourcing channel 111, a second auxiliary content sourcing channel 113, and a third auxiliary content sourcing channel 119. After receiving the auxiliary content from the gateway 110, the UE 102 may present the auxiliary content on a display such as above, below, on the left side, or on the right side of information associated with the application 108. While three auxiliary content sourcing channels are illustrated in FIG. 1, it is understood that the gateway 110 may support two auxiliary content sourcing channels or more than three auxiliary content sourcing channels.

The gateway 110 may be referred to in some contexts as a gateway network node. The gateway 110 is implemented as a computer system and may be operated by a communications service provider and may be located in a core network or network interior of the communications service provider. The UE 102 may be a mobile telecommunication device, a mobile phone, a smart phone, a personal digital assistant (PDA), a media player, a wearable computer, a headset computer, a laptop computer, a notebook computer, a tablet computer, or another wireless communication enabled electronic device. In an embodiment, the system 100 further comprises a desktop computer 103 or other computing device that is communicatively coupled to the network 106 by a wired communication link. The desktop computer 103 may execute an application 125 that is similar to the application 108. For example, the application 125 may be a gaming application, a browser application, a navigation application, or other application. The application 125 may request auxiliary content from the gateway 110 for presentation in a display of the desktop computer 103 proximate to information associated with the application 125. The network 106 may be one or more public communication networks, one or more private communication networks, or a combination thereof.

The first auxiliary content sourcing channel 111 may be constituted by communication between the gateway 110 and a plurality of content providers 112. The second auxiliary content sourcing channel 113 may be constituted by communication between the gateway 110 and a content broker 114. The third auxiliary content sourcing channel 119 may be constituted by communication between the gateway 110 and a content exchange 120. While for purposes of illustration the auxiliary content sourcing channels 111, 113, 119 in FIG. 1 are shown connected directly to the gateway 110, it is understood that the gateway 110 is communicatively coupled to the auxiliary content sourcing channels 111, 113, 119 via the network 106.

Each of the different auxiliary content sources 112, 114, 120 may represent different business and/or communication mechanisms for obtaining auxiliary content to transmit to the UEs 102. The content sources 112, 114, 120 may be each implemented as a computer system. Computer systems are described further hereinafter. The content providers 112 may pay to have the opportunity to present auxiliary content on the UEs 102. The content providers 112 may be bidding sites that shop a request for auxiliary content sent from the gateway 110 to the content provider 112 to affiliated bidders, and the content providers 112 may provide a selected auxiliary content as well as a bid price to the gateway 110. The content broker 114 may be coupled to an auxiliary content data store 116.

The gateway 110 may call upon the content broker 114 to provide some of the auxiliary content that is transmitted by the gateway 110 to the UEs 102. In an embodiment, a wireless service provider or other enterprise that operates the gateway 110 may also operate the content broker 114 and data store 116. The data store 116 may store auxiliary content that the content broker 114 may send in a response to a request for auxiliary content.

The content exchange 120 may be a bidding site that is operated by the wireless service provider or enterprise that operates the gateway 110. The gateway 110 may call upon the content exchange 120 to provide some of the auxiliary content that is transmitted by the gateway 110 to the UEs 102. Alternatively or additionally, the gateway 110 may call upon the content exchange 120 to provide bids that compete with bids provided by autonomous or independent content providers 112 for the opportunity to present auxiliary content on the UEs 102. The content exchange 120 may be communicatively coupled to bidding affiliates such as a first content bidder 122a, a second content bidder 112b, and a third content bidder 122c. Each content bidder 122 may receive requests to bid to present auxiliary content on the UE 102 or the desktop computer 103 and may choose to return a bid along with auxiliary content to the content exchange 120 or may decline to bid. The request to bid sent by the content exchange 120 to the content bidders 122 may comprise some profile and/or history information about the UE 102 or desktop computer 103, for example demographic information of a subscriber associated with the UE 102 and/or summary information about browsing interests of the user of the UE 102 or desktop computer 103.

When viewed from a perspective of supplying an ongoing flow of auxiliary content to a large number of UEs 102, the gateway 110 may rely upon auxiliary content sourced from each of auxiliary content sourcing channels 111, 113, 119. A specific mix of content flow from the auxiliary content sources 112, 114, 120 may be determined by sourcing rules 130. In some contexts, the sourcing rules 130 may be referred to as auxiliary content sourcing priorities. The sourcing rules 130 may define a ratio or mix of auxiliary content sourcing. For example, the sourcing rules 130 may direct the gateway 110 to source 50% of auxiliary content from the content provider 112 (i.e., from the first auxiliary content sourcing channel 111), 30% of auxiliary content from the content exchange 120 (i.e., from the third auxiliary content sourcing channel 119), and 20% of the auxiliary content from the content broker 114 (i.e., from the second auxiliary content sourcing channel 113). In addition to defining ratios of distribution of auxiliary content requests among different auxiliary content sourcing channels 111, 113, 119, the sourcing rules 130 may further define a ratio or mix of auxiliary content sourcing distribution among different content providers 112, for example a ratio for a first content provider, a ratio for a second content provider, a ratio for a third content provider, a ratio for a fourth content provider, etc.

The percentage or ratio of source selection may be settled or modulated over substantial time periods, for example over a second, over a minute, over a quarter-hour, over an hour, or over another time period. Said in other words, the ratio or percentage of sourcing may not accord with the rules over a small or limited number of sourcing events but is expected to approximate the ratios or percentages defined by the sourcing rules 130 over the relatively large number of sourcing events that fall in a substantial time period (a second, a minute, a quarter-hour, an hour, etc.). It is observed that the gateway 110 may process hundreds of thousands of auxiliary content requests per second. If 100 or even 1000 consecutive auxiliary content requests are all supplied from one auxiliary content sourcing channel, that may be irrelevant, so long as the sourcing priority or sourcing rules 130 are generally satisfied when considering 150,000 auxiliary content requests received by the gateway 110 over a second's time. The gateway 110 may transmit selected auxiliary content to the UE 102 within less than 150 ms, 300 ms, 500 ms, or some other time interval.

It may be that relying on both independent auxiliary content bidding sites (e.g., content providers 112) and the content exchange 120 promotes the gateway 110 better determining market rates for opportunities to present auxiliary content on the UEs 102. This may promote the gateway 110 better forecasting a market rate trend which may allow the gateway 110 or others to adapt proactively, for example by boosting reliance on auxiliary content drawn from the content broker 114.

The sourcing rules 130 may be defined by an administrator of the gateway 110. In some cases, an affiliate such as a marketing company may pay the wireless service provider or enterprise that operates the gateway 110 to distribute a specific number of presentations of auxiliary content (which may be referred to as experiences in some contexts) to the UEs 102 during a delimited period of time. For example, a ski resort may pay for 100,000 experiences of its ad during the two week duration of the winter Olympics. The marketing company may pay a premium for this campaign, and the sourcing rules 130 may be temporarily changed to reflect this preference, for example, changing the auxiliary sourcing mix to 20% of auxiliary content sourced from the content provider 112, 30% of auxiliary content sourced from the content exchange 120, and 50% of auxiliary content sourced from the content broker 114, where the ads from the marketing company are sourced from. As an alternative example, a bicycle equipment company may pay for 500,000 experiences of its ad during the Tour de France. Again, the sourcing rules 130 may be temporarily changed to reflect this preference. In the past this kind of sourcing mix adaptation may have been difficult and/or time consuming. For example, a sourcing directive or rule may have been transmitted to a large number of UEs 102 and/or applications 108 on the UEs 102 to accomplish this altered auxiliary content selection.

The content providers 112 may expect to receive requests for auxiliary content and to transmit responses with auxiliary content according to a particular format. Said in another way, each different content provider 112 may communicate with the gateway 110 in accordance with a different application programming interface (API) defined by the content provider 112. This definition may be embedded in or encapsulated in a software development kit (SDK) published by the content providers 112. In the past, when the application 108 sent auxiliary content request messages to content providers 112 without the mediation of the gateway 110, the application 108 may have implemented APIs of each content provider 112. This could pose a burden on developers of the application 108 (e.g., implementing support for several different APIs is a greater burden than implementing a single API).

According to the teachings of the present disclosure, the UEs 102 implement a single gateway API 124 for communication with the gateway 110, and the gateway 110 transcodes or mediates between this gateway API 124 and different APIs of the content providers 112. In an embodiment, one or more transcoder components 128 may provide this transcoding or mediation between the gateway API 124 and an API of one of the content providers 112. For example, the application 108 formats an auxiliary content request message according to the gateway API 124 and transmits this request message to the gateway 110. A first transcoder 128 of the gateway 110 may reformat or transcode the request message as a first transcoded auxiliary content request message according to a first API of a first content provider, a second transcoder 128 of the gateway 110 may transcode the request as a second transcoded auxiliary content request message according to a second API of a second content provider, and a third transcoder 128 of the gateway 110 may transcode the request as a third transcoded auxiliary content request message according to a third API of a third content provider.

Transcoding may comprise a variety of actions. Transcoding may involve taking a plurality of separate fields of information in the request message and converting them into a single combined field in the transcoded request message. Transcoding may involve breaking a single combined field in the request message and converting into multiple fields in the transcoded request message. Transcoding may involve deleting some fields of the request message from the transcoded request message. Transcoding may involve supplying a default value for the transcoded request message that was not part of the request message. Transcoding may involve changing the format of a field, for example changing an integer to a real-number representation or vice versa or changing a time representation to a different time representation. Transcoding may involve changing a number with a large range to an enumerated value having a limited number of different values, for example changing an age that ranges over a large range or numbers to an enumerated set of ten different age categories or age bins such as a first category or bin for ages 0-10, a second category or bin for ages 11-20, . . . , and a tenth bin for ages 90 and up. Yet other kinds of transcoding are contemplated to be used in transcoding. The application 126 of the gateway 110 may send the first transcoded auxiliary content request message to the first content provider, send the second transcoded auxiliary content request message to the second content provider, and send the third transcoded auxiliary content request message to the third content provider.

Continuing this example, the gateway 110 may receive a first auxiliary content response message formatted according to the first API from the first content provider, receive a second auxiliary content response message formatted according to the second API from the second content provider, and receive a third auxiliary content response message formatted according to the third API from the third content provider. The gateway 110 may select one of the responses, and an appropriate one of the transcoders 128 may transcode the selected response message as a transcoded auxiliary content response message according to the gateway API 124, and transmit the transcoded auxiliary content response message to the application 108 and/or to the UE 102. It is understood that the transcoding from the selected response message to the transcoded auxiliary content response message may be a reverse or mirror of the transcoding process described above. In the case of transcoding from an enumerated range of a few values to a different numerical range having more values, for example as in the age versus age category example described above, a broad category or bin may be mapped to a specific value that fits in about the middle of the category or bin. For example, if converting from a second category or bin of age that corresponds to the age group 11-20, the transcoding may convert or reformat the value of the second category to the middle value in the range 11-20, for example 15 or 16. It is understood that the response messages may comprise the auxiliary content itself, for example a multimedia file or graphic file that may presented on a display of the UE 102. The transcoding and/or mediation of requests and responses as described above can ease the effort of developing applications 124 for UEs 102. Additionally, the transcoding and/or mediation of requests and responses can promote the affiliation of new content providers 112 to the gateway, because the legacy UEs 102 and/or applications 108 need not, in system 100, be adapted to interwork with a new API of the new content provider 112: instead only the gateway transcoder 128 for this specific new content provider 112 needs to be developed and deployed.

It is understood that when handling any single request for auxiliary content from an application 108, the gateway 110 may send it to only one of the content providers 112, instead of to a plurality of the content providers 112. This may be the case when the gateway 110 analyzes a profile or history associated with the UE 102 and determines that a specific one of the content providers 112 would be most suited or most desirous of sourcing the requested auxiliary content to the UE 102 and/or application 108. In this circumstance, the gateway 110 transcodes the auxiliary content request from the gateway API to the format of the API supported by the selected content provider 112 and transcodes the auxiliary content response from the format of the API supported by the selected content provider 112 to the format of the gateway API. This obviates transcoding to or from a plurality of different APIs in handling a single auxiliary content request, and this simplification may be sufficient motivation for selecting one of the content providers 112 to send the auxiliary content request to versus a plurality. In an embodiment, the gateway 110 may distribute each auxiliary content request to a single one of the content providers 112 but distribute subsequent auxiliary content requests among the plurality of content providers 112 according to a distribution algorithm such as round robin, according to a flow request provided by the content providers 112, or according to another method.

The content providers 112 may expect to receive auxiliary content requests from a large number of different UEs 102. Thus, the content providers 112 may expect to receive requests from a large number of different internet protocol (IP) addresses. When the content providers 112 receive, instead, a large number of requests from the gateway 110 (the source address of the header of the request messages originated by the gateway 110 may contain the IP address of the gateway 110), the content providers 112 may be alarmed or distrust the gateway 110. The content providers 112 may suspect this as an instance of click fraud, for example. The present disclosure contemplates overcoming this distrust or reservation of content providers 112 in a variety of different and/or complimentary ways.

In an embodiment, the application 126 and/or the transcoders 128 populate a parameter of the request header and/or request message with an indication that the gateway 110 is a legitimate requestor and not a fraudster. For example, the request header and/or request message may be populated with a collaborator mediation indication. Said in other words, the request header and/or request message may contain a field or parameter that contains an identification of the gateway 110 as a mediation collaborator (i.e., a host that leverages the transcoders 128 to maximize the number of UEs 102 that the subject content provider 112 may reach out to). In an embodiment, the gateway 110 may encrypt the collaborator mediation indication so as to thwart spoofing by others of this indication. For example, the content provider 112 and the gateway 110 may follow a confidential but mutually understood sequence of hashing the collaborator mediation indication such that merely copying a previous collaborator mediation indication will not suffice, or at least will not suffice indefinitely, to be granted faith and confidence. In another embodiment, the content providers 112 may be configured to white list the IP address of the gateway 110 (or IP address of multiple different gateways 110, for example in the instance that the gateway 110 is a distributed computer system), so that click fraud detection algorithms executing on the content providers 112 may ignore what otherwise might be deemed click fraud from the gateway 110.

Figure 2:
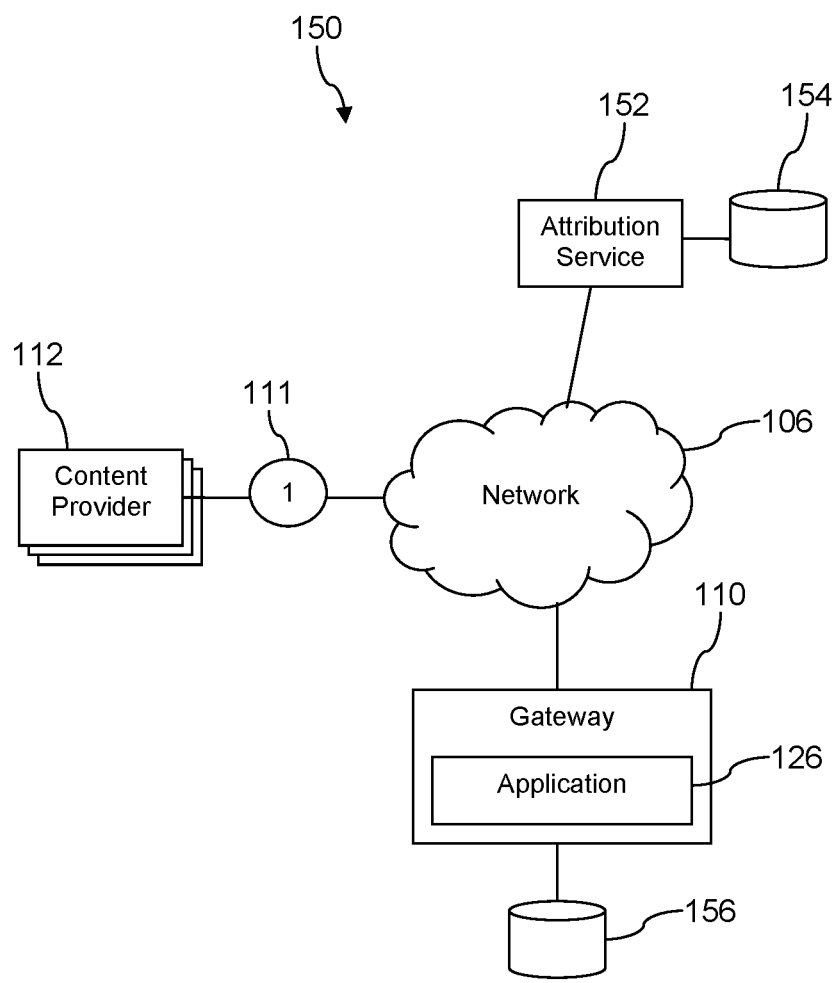
FIG. 2 is a block diagram of a communication system according to another embodiment of the disclosure.

Turning now to FIG. 2, a system 150 is described. In an embodiment, the system 150 comprises all of the components described above with reference to FIG. 1 and further comprises a gateway log data store 156, a third party attribution service 152, and a third party log data store 154. In an embodiment, the application 126 and/or the transcoders 128 keeps a log of request messages sent to the content providers 112 and stores this log in the gateway log data store 156. This log may be examined by the content providers 112 to confirm freedom from click fraud. Further, the third party attribution service 152 may be configured to monitor the transmission of auxiliary content request messages to the content providers 112 and log this traffic in the third party log data store 154. Thus, the third party attribution service 152 and third party log data store 154 can provide an independent corroboration of the claims of the gateway 110 to not generate click fraud.

Figure 3:
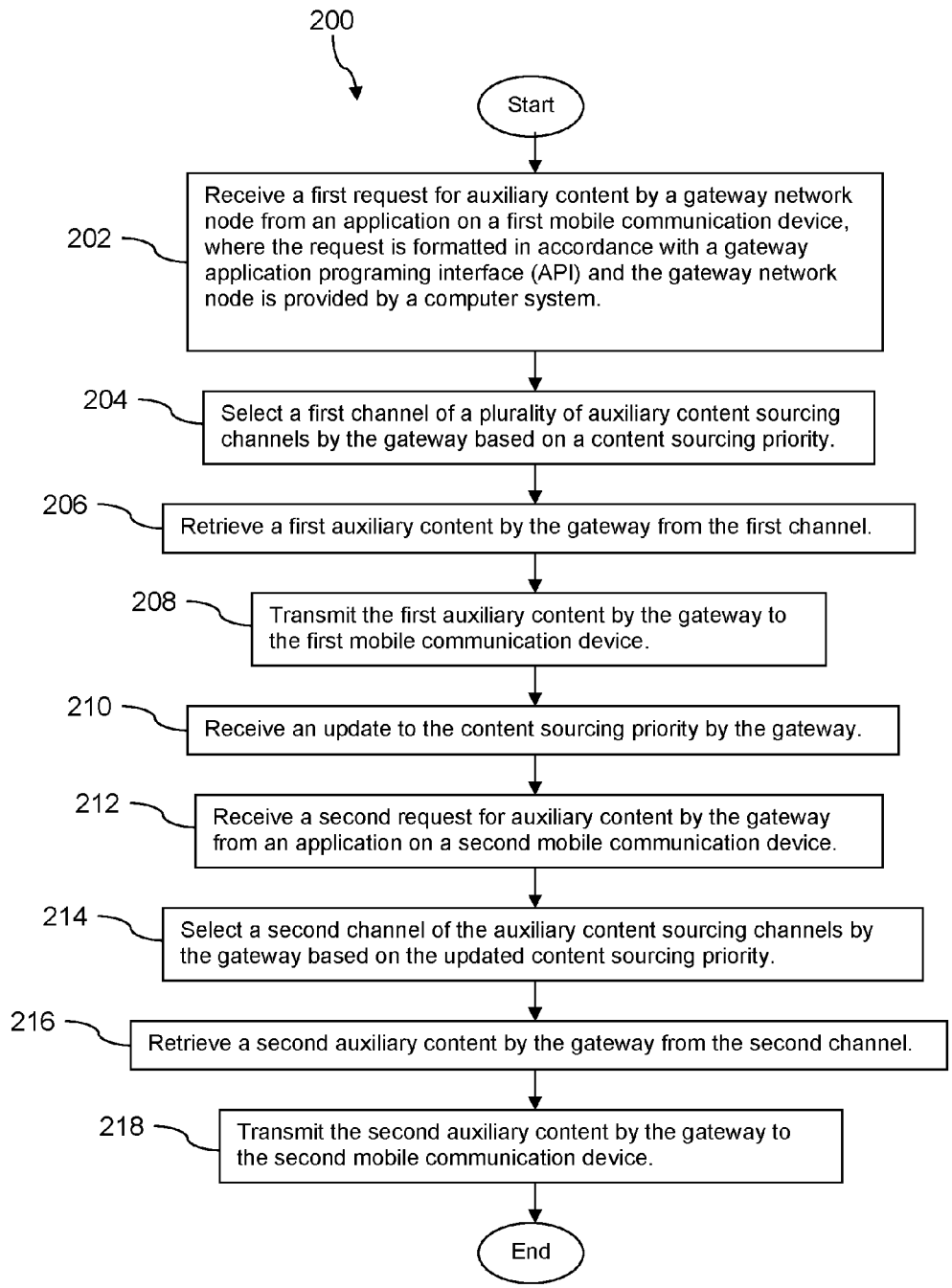
FIG. 3 is a flow chart of a method according to an embodiment of the disclosure.

Turning now to FIG. 3, a method 200 is described. At block 202, a gateway network node receives a first request for auxiliary content from an application on a first mobile communication device, where the request is formatted in accordance with a gateway application programming interface (API) and the gateway network node is provided by a computer system. For example, the gateway 110 receives a request for auxiliary content from the application 108 executing on the UE 102 or receives a request for auxiliary content from the application 125 executing on the desktop computer 103. The auxiliary content request is formatted according to an API supported by the gateway 110. At block 204, the gateway selects a first channel of a plurality of auxiliary content sourcing channels based on a content sourcing priority. For example, the gateway 110 selects one of the auxiliary content sourcing channels 111, 113, 119 based on the sourcing rules 130. The gateway 110 sends the auxiliary content request to the selected auxiliary content sourcing channel 111, 113, 119. In an embodiment, the gateway 110 transcodes the auxiliary content request from the gateway API format to a different format in accordance with an API supported by an auxiliary content provider 112. At block 206, the gateway retrieves a first auxiliary content from the first channel.

At block 208, the gateway transmits the first auxiliary content to the first mobile communication device. In an embodiment, the gateway 110 transcodes the first auxiliary content from a format compatible with an API supported by the first sourcing channel to a format in accordance with the gateway API. At block 210, the gateway receives an update to the content sourcing priority. For example, a rule or criteria for distributing auxiliary content requests among the auxiliary content sourcing channels 111, 113, 119 is received and the sourcing rules 130 are revised or updated accordingly. At block 212, the gateway receives a second request for auxiliary content from an application on a second mobile communication device. At block 214, the gateway selects a second channel of the auxiliary content sourcing channels based on the updated content sourcing priority. For example, the gateway 110 chooses to distribute auxiliary content requests from the application 108 executing on the UE 102 or from the application 125 executing on the desktop computer 103 to auxiliary content sourcing channels 111, 113, 119 differently, in accordance with the revised or updated sourcing rules 130. This change may involve shifting a percentage of distribution or a ratio of distribution of auxiliary content requests among the different auxiliary content sourcing channels 111, 113, 119.

At block 216, the gateway retrieves a second auxiliary content from the second channel. At block 218, the gateway transmits the second auxiliary content to the second mobile communication device.

Figure 4:
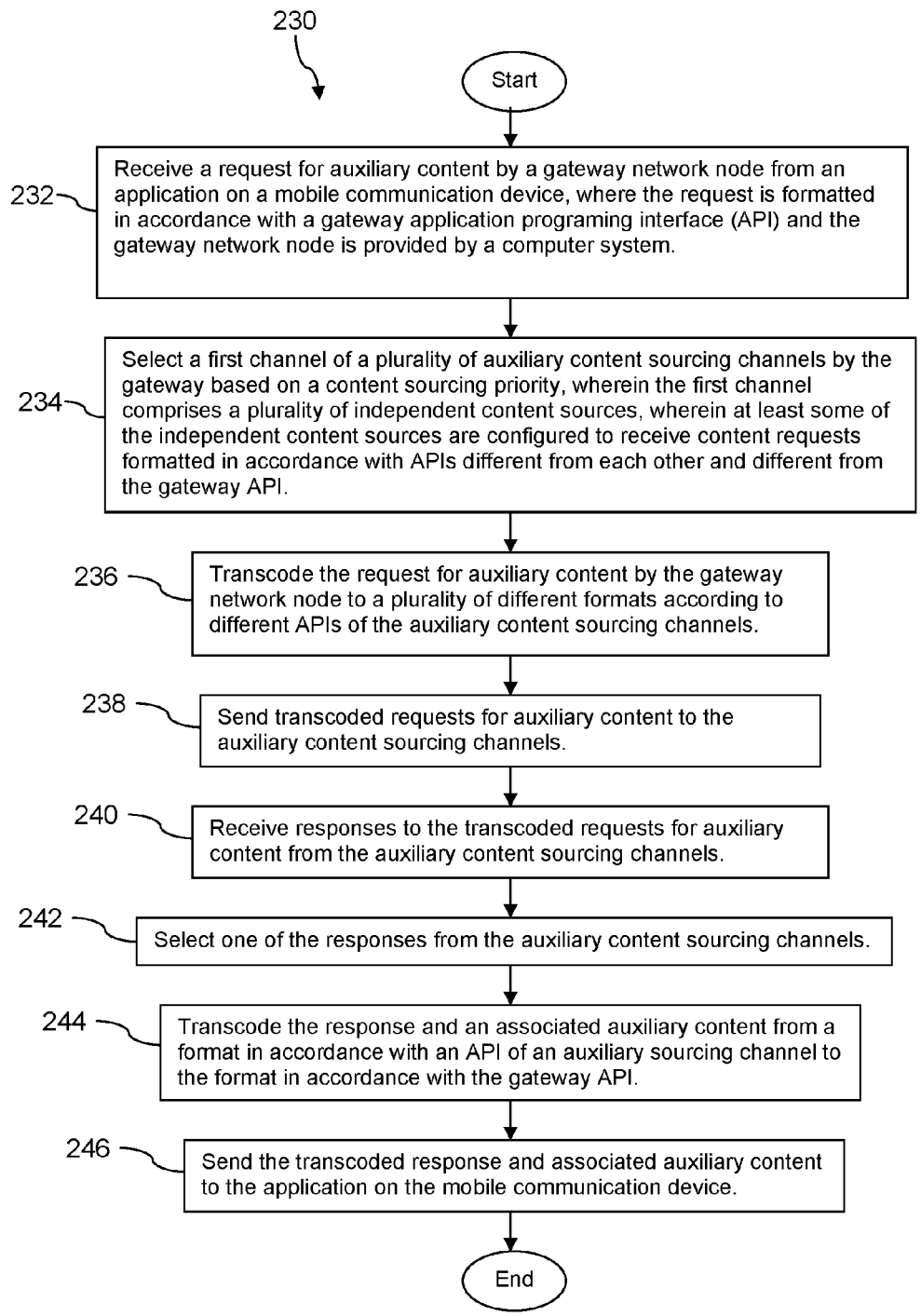
FIG. 4 is a flow chart of a method according to another embodiment of the disclosure.

Turning now to FIG. 4, a method 230 is described. At block 232, a gateway network node receives a request for auxiliary content from an application on a mobile communication device, where the request is formatted in accordance with a gateway application programming interface (API) and the gateway network node is provided by a computer system. At block 234, the gateway selects a first channel of a plurality of auxiliary content sourcing channels based on a content sourcing priority, wherein the first channel comprises a plurality of independent content sources, wherein at least some of the independent content sources are configured to receive content requests formatted in accordance with APIs different from each other and different from the gateway API. For example, the gateway 110 selects one of the auxiliary content sourcing channels 111, 113, 119.

At block 236, the gateway transcodes the request for auxiliary content to a plurality of different formats according to different APIs of the auxiliary content sourcing channels. At block 238, the gateway sends transcoded requests for auxiliary content to the auxiliary content sourcing channels. At block 240, the gateway receives responses to the transcoded requests for auxiliary content from the auxiliary content sourcing channels.

At block 242, the gateway selects one of the responses from the auxiliary content sourcing channels. At block 244, the gateway transcodes the response and an associated auxiliary content from a format in accordance with an API of an auxiliary sourcing channel to the format in accordance with the gateway API. At block 246, the gateway sends the transcoded response and associated auxiliary content to the application on the mobile communication device.

Figure 5:
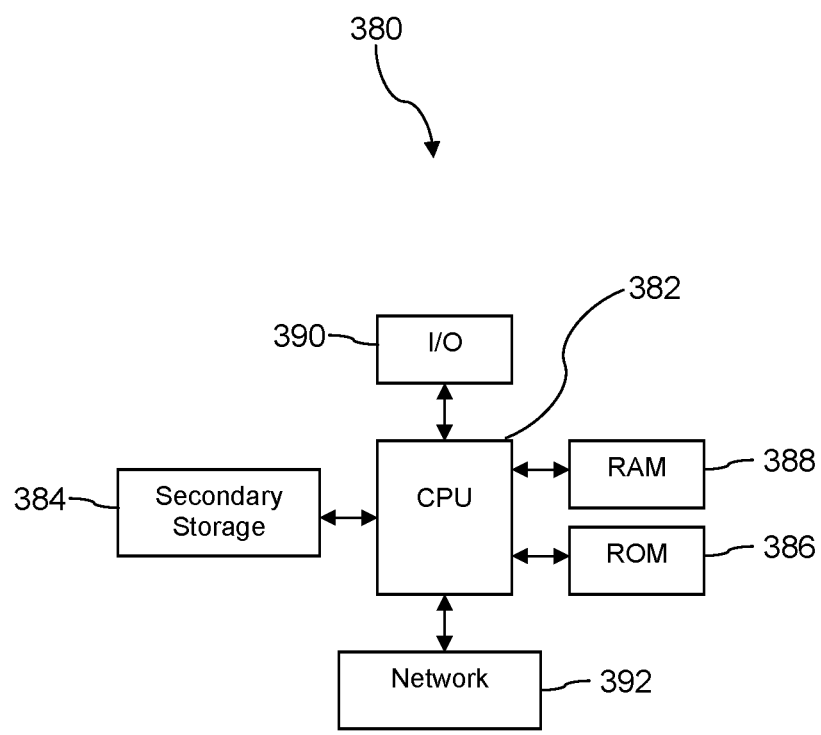
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An auxiliary content delivery gateway, comprising:
 a processor;
 a non-transitory memory; and
 an application stored in the non-transitory memory that, when executed by the processor:
  creates auxiliary content request messages comprising a collaborator mediation indication based on requests for auxiliary content received from a plurality of mobile communication devices,
  transmits the auxiliary content request messages to a plurality of auxiliary content sourcing channels, whereby the auxiliary content sourcing channels discern that the auxiliary content request messages do not constitute click fraud based on the collaborator mediation indication in the auxiliary content request messages,
  receives a plurality of auxiliary content response messages from the auxiliary content sourcing channels, and
  transmits selected auxiliary content to the mobile communication devices based on the auxiliary content response messages, wherein the gateway transmits the selected auxiliary content to the mobile communication devices within less than 500 mS of receipt of the requests for auxiliary content received from the mobile communication devices.

2. The gateway of claim 1, wherein at least one of the requests for auxiliary content received from the mobile communication devices is a gateway application programming interface (API) format.

3. The gateway of claim 2, wherein the application further transcodes at least one of the auxiliary content response messages in the gateway API format before transmitting the at least one of the auxiliary content response messages.

4. The gateway of claim 3, wherein creating the auxiliary content requests messages comprises transcoding at least one request of the requests received for auxiliary content from the gateway API format to a format in accordance with one of the auxiliary content sourcing channels.

5. The gateway of claim 1, wherein the collaborator mediation indication comprises an encrypted identity of the gateway.

6. The gateway of claim 1, wherein the application further creates a log of auxiliary content request messages transmitted by the gateway to the auxiliary content sourcing channels, whereby the log supports third party verification of the absence of click fraud.

7. The gateway of claim 1, wherein the mobile communication devices comprise mobile phones, smart phones, personal digital assistants (PDAs), media players, wearable computers, headset computers, laptop computers, tablet computers, and notebook computers.

8. An auxiliary content delivery gateway, comprising:
 a processor;
 a non-transitory memory; and
 an application stored in the non-transitory memory that, when executed by the processor:
  receives a plurality of requests for auxiliary content from a plurality of mobile communication devices, wherein the requests are in accordance with a gateway application programming interface (API) format,
  transcodes the requests for auxiliary content to a plurality of different formats according to different APIs of a plurality of auxiliary content sourcing channels,
  populates each of the transcoded requests for auxiliary content with a collaborator mediation indication,
  transmits the transcoded requests for auxiliary content to the auxiliary content sourcing channels,
  receives a plurality of auxiliary content response messages from the auxiliary content sourcing channels,
  transmits selected auxiliary content to the mobile communication devices based on the auxiliary content response messages, and
  creates a log of auxiliary content request messages transmitted by the gateway to the auxiliary content sourcing channels, wherein the log is examined by one or more content providers associated with the auxiliary content sourcing channels to confirm the absence of click fraud.

9. The gateway of claim 8, wherein the application further transcodes at least one of the auxiliary content response messages and an associated auxiliary content to the gateway API format before transmitting the at least one of the auxiliary content response messages and the associated auxiliary content to at least one of the mobile communication devices.

10. The gateway of claim 8, wherein at least one of the requests for auxiliary content is a request for advertising content.

11. The gateway of claim 8, wherein the transcoded requests for auxiliary content are transmitted to the auxiliary content sourcing channels based on a content sourcing priority.

12. The gateway of claim 8, wherein the application further stores the log in a gateway log data store.

13. A method of delivering auxiliary content to mobile communication devices and promoting independent corroboration of the absence of click fraud, the method comprising:
 receiving, by an auxiliary content delivery gateway, a plurality of requests for auxiliary content from a plurality of mobile communication devices, wherein the requests are in accordance with a gateway application programming interface (API) format;
 transcoding, by the gateway, the requests for auxiliary content to a plurality of different formats according to different APIs of a plurality of auxiliary content sourcing channels;
 populating, by the gateway, each of the transcoded requests with a collaborator mediation indication, wherein the collaborator mediation indication comprises an encrypted identity of the gateway;
 transmitting, by the gateway, the transcoded requests for auxiliary content to the auxiliary content sourcing channels;
 monitoring, by a third party attribution service, the transmission of the transcoded requests to the auxiliary content sourcing channels;

creating, by the third party attribution service, a log of auxiliary content request messages transmitted by the gateway to the auxiliary content sourcing channels, wherein the log provides independent corroboration of the absence of click fraud for content providers associated with the auxiliary content sourcing channels;

receiving, by the gateway, a plurality of auxiliary content response messages from the auxiliary content sourcing channels; and transmitting, by the gateway, selected auxiliary content to the mobile communication devices based on the auxiliary content response messages.

14. The method of claim 13, further comprising transcoding, by the gateway, at least one of the auxiliary content response messages and an associated auxiliary content to the gateway API format before transmitting the at least one of the auxiliary content response messages and the associated auxiliary content to at least one of the mobile communication devices.

15. The method of claim 13, further comprising storing, by the third party attribution service, the log in a third party log data store.

16. The method of claim 13, wherein the transcoded requests for auxiliary content are transmitted to the auxiliary content sourcing channels based on a content sourcing priority.

* * * * *